US008928660B2

(12) United States Patent  
Choe

(10) Patent No.: US 8,928,660 B2  
(45) Date of Patent: Jan. 6, 2015

(54) PROGRESSIVE MESH DECODING APPARATUS AND METHOD

(75) Inventor: Sung-yul Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1111 days.

(21) Appl. No.: 12/714,069

(22) Filed: Feb. 26, 2010

(65) Prior Publication Data

US 2010/0266216 A1    Oct. 21, 2010

(30) Foreign Application Priority Data

Apr. 15, 2009 (KR) .......... 10-2009-0032923

(51) Int. Cl.
G06T 15/30 (2011.01)
H04N 19/54 (2014.01)
G06T 17/20 (2006.01)
H04N 19/44 (2014.01)
G06T 9/00 (2006.01)

(52) U.S. Cl.
CPC .......... *G06T 17/20* (2013.01); *H04N 19/00618* (2013.01); *H04N 19/00533* (2013.01); *G06T 9/001* (2013.01)
USPC ...................................................... 345/423

(58) Field of Classification Search
CPC ............... G06T 17/20; G06T 9/001
USPC ....................................................... 345/423
See application file for complete search history.

(56) References Cited

U.S. PATENT DOCUMENTS 5,963,209 A    10/1999 Hoppe
6,108,006 A     8/2000 Hoppe
6,169,549 B1 *  1/2001 Burr .............................. 345/419
6,462,738 B1   10/2002 Kato
6,795,070 B1    9/2004 Laurent-Chatenet et al.
7,283,134 B2   10/2007 Hoppe
2006/0044309 A1  3/2006 Kanai et al.

FOREIGN PATENT DOCUMENTS

| JP | 3615007 | 7/1997 |
| JP | 2001-52194 | 2/2001 |
| JP | 2002-527014 | 8/2002 |
| JP | 2005-242647 | 9/2005 |
| JP | 2006-72531 | 3/2006 |
| JP | 2007-265459 | 10/2007 |
| WO | WO 00/21035 | 4/2000 |

OTHER PUBLICATIONS

Pierre Alliez et al., "Progressive Compression for Lossless Transmission of Triangle Meshes," *Conference Proceedings of SIGGRAPH 2001*, Aug. 2001, pp. 198-205, ACM, Los Angeles, CA, USA.

* cited by examiner

Primary Examiner — Kee M Tung  
Assistant Examiner — Peter Hoang  
(74) Attorney, Agent, or Firm — NSIP Law

(57) ABSTRACT

A progressive mesh decoding apparatus, a progressive mesh decoding method and a computer readable recording medium using the same are provided. In the progressive mesh decoding method, a first desired resolution mesh is progressively reconstructed from a base mesh through vertex addition. Vertex level information indicating a resolution level of a mesh corresponding to a predetermined process of the first desired resolution mesh reconstructing process is recorded for respective vertices added at the predetermined process. In response to a second desired resolution mesh having a second desired resolution level lower than the first desired resolution level being requested, the second desired resolution mesh is reconstructed by deleting vertices from the first desired resolution mesh, wherein vertices to be deleted in a predetermined process of the second desired resolution mesh reconstructing process are determined based on the vertex level information.

18 Claims, 6 Drawing Sheets

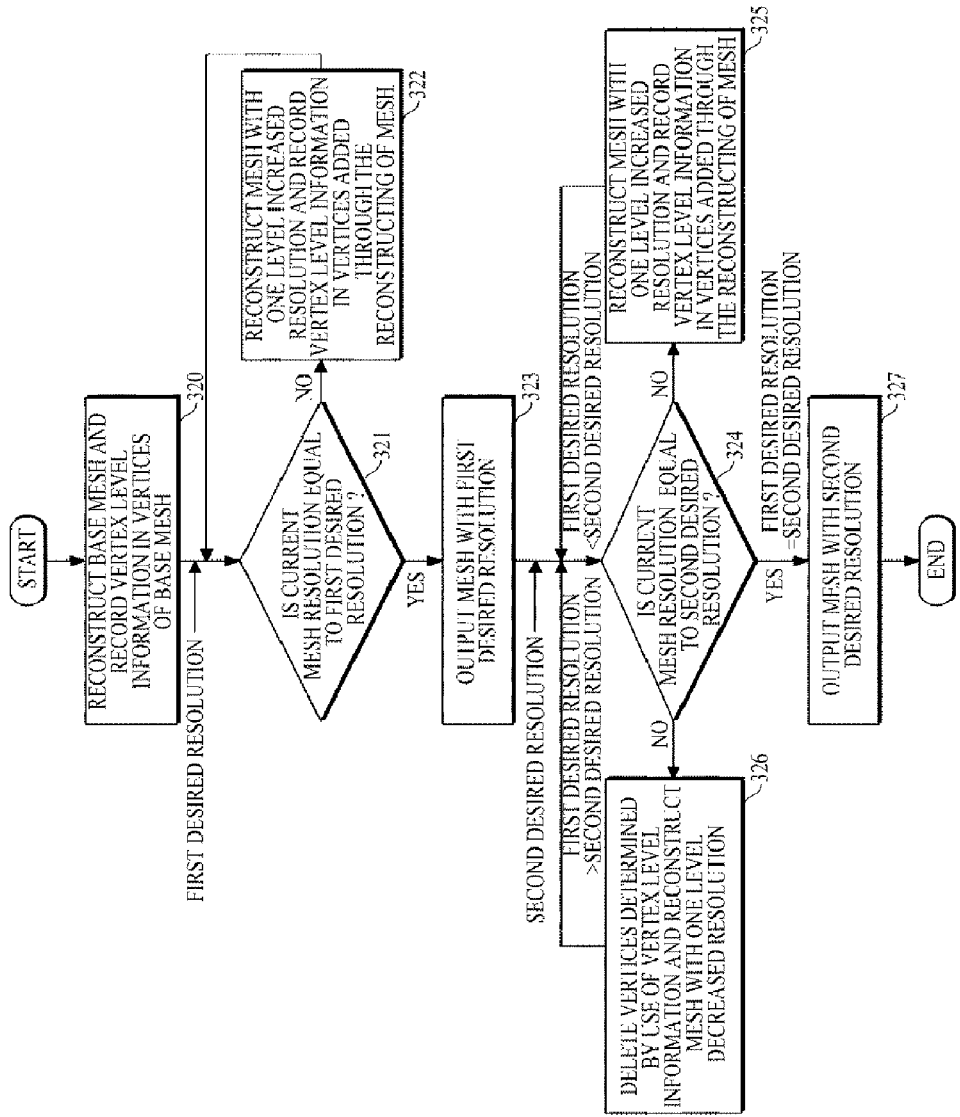

PROGRESSIVE MESH DECODING APPARATUS AND METHOD

CROSS-REFERENCE TO RELATED APPLICATION(S)

This application claims the benefit under 35 U.S.C. §119(a) of Korean Patent Application No. 10-2009-0032923, filed on Apr. 15, 2009, the disclosure of which is hereby incorporated by reference in its entirety for all purposes.

BACKGROUND

1. Field

The following description relates to computer graphics, and more particularly, to progressive mesh decoding algorithms used to represent a three-dimensional model in computer graphics and methods using the same.

2. Description of the Related Art

A polygonal mesh is widely used as a method of representing a three-dimensional model is in computer graphics. Such a polygonal mesh is used to define a shape of a three-dimensional model to be represented, and a triangle mesh is mainly used as the polygonal mesh. The triangle mesh refers to a representation scheme, in which a three-dimensional model having an irregular shape is decomposed into a plurality of triangular facets to represent the shape of the three-dimensional model, or refers to a graphic image represented through this representation scheme. According to the triangle mesh, geometry information of vertices forming a triangle and connectivity information of connecting the vertices are used to represent a model, and thus the representation of a three-dimensional model requires much more data as compared to when representing a two dimensional model having a regular shape.

In compressing or encoding a triangular mesh, a scheme of encoding a triangular mesh having a simple resolution, that is, a scheme of encoding vertices and connectivity information between the vertices has been suggested. However, such an encoding scheme may easily be affected by time delay or transmission error occurring in a network transmission. In addition, in a graphic application device for representing a three-dimensional model by employing such a simple resolution mesh, a three-dimensional image having various resolutions is not represented in a rapid manner.

As an alternative to improve such drawbacks of the simple resolution mesh, a progressive mesh encoding algorithm also called a progressive mesh compression algorithm has been suggested. For example, where the progressive mesh algorithm is used, a mesh having a desired resolution is reconstructed by increasing the resolution from a base mesh having the lowest resolution by one level at a time. In a graphic application device employing such a is progressive mesh encoding algorithm, a remote object is schematically represented at a low resolution and a close object is represented in detail at a high resolution.

However, according to the progressive mesh algorithm capable of obtaining a three-dimensional image with various resolutions, larger amounts of data need to be encoded as compared to the single resolution mesh algorithm. The amount of encoding data is directly proportional to the resolution level supported by the progressive mesh algorithm. Even though network bandwidths, data transmission speeds and capacities of storage medium are continuously increasing, this increase of data causes a difficulty in encoding, transmitting, storing and decoding the data. In this regard, a progressive mesh decoding method capable of reducing the amount of mesh data generated through an encoding algorithm and efficiently reconstructing a three-dimensional image having various resolutions is required.

In addition, the reconstructed mesh resolution needs to be changed in a graphic application device in a flexible and rapid manner. For example, if the position of a camera or object changes, the resolution of a three-dimensional image being displayed needs to be increased or decreased rapidly according to the direction of change. In this regard, a progressive mesh decoding method capable of reconstructing a three-dimensional image having a desired resolution in a flexible and rapid manner is required.

SUMMARY

Accordingly, in one general aspect, there is provided a progressive mesh decoding apparatus and a progressive mesh decoding method capable of saving memory or network bandwidth by using smaller amount of mesh data.

In another aspect, there is provided a progressive mesh decoding apparatus and a is progressive mesh decoding method wherein a desired high resolution mesh does not need to be reconstructed from a based mesh and a desired low resolution mesh may be generated from a high resolution mesh.

In another aspect, there is provided a progressive mesh decoding apparatus and a progressive mesh decoding method wherein a desired high resolution mesh does not need to be reconstructed from a based mesh and a desired resolution mesh may be generated directly from an arbitrary state mesh.

In another aspect, there is provided a progressive mesh decoding apparatus and a progressive mesh decoding method wherein mesh data generated through a conventional progressive mesh encoding algorithm is employed without additional processing and a desired resolution mesh is reconstructed in a rapid manner so that the resolution adjustment is achieved in real time.

In one general aspect, there is provided a progressive mesh decoding method. The method is as follows. A first desired resolution mesh having a first desired resolution level is progressively reconstructed from a base mesh through vertex addition, vertex level information indicating a resolution level of a mesh corresponding to a predetermined process of the first desired resolution mesh reconstructing process being recorded for respective vertices added at the predetermined process. In response to a second desired resolution mesh having a second desired resolution level lower than the first desired resolution level being requested, the second desired resolution mesh is progressively reconstructed by deleting vertices from the first desired resolution mesh, vertices to be deleted in a predetermined process of the second desired resolution mesh reconstructing process being determined based on the vertex level information.

In another general aspect, there is provided a progressive mesh decoding method. The method is as follows. A mesh having a first resolution level corresponding to a lowest resolution level is reconstructed by decoding input encoded mesh data, first vertex level information indicating the first resolution level being recorded for respective vertices included in the first resolution mesh. Whether the first resolution level is equal to a first desired resolution level is determined. In response to the first resolution level not being equal to the first desired resolution level, a mesh having a second resolution level one level higher than the first resolution level is reconstructed by decoding detail data of the second resolution level, which is obtained from the encoded mesh data, for vertex addition, second vertex level information indicating the second resolution level being recorded for the respective vertices added to the first resolution mesh.

In another general aspect, there is provided a progressive mesh decoding apparatus. The progressive mesh decoding apparatus includes a base mesh reconstruction unit, a resolution comparison unit, a resolution increasing unit, a resolution decreasing unit and an output unit. The base mesh reconstruction unit is configured to reconstruct a base mesh by decoding detail data of a base data included in input encoded mesh data. The resolution comparison unit is configured to compare a resolution level of a reconstructed current mesh with an input desired resolution level. In response to the resolution level of the current mesh being lower than the input desired resolution level, the resolution increasing unit is configured to reconstruct a mesh having a resolution level one level higher than the resolution level of the current mesh through vertex addition, vertex level information indicating the resolution level one level higher than that of the current mesh being recorded for the added vertices. In response to the resolution level of the current mesh being higher than the input desired resolution level, the resolution decreasing unit is configured to reconstruct a mesh having a resolution level one level lower than the resolution level of the current mesh by deleting vertices, vertices to be deleted being determined by use of the vertex level information recorded by the resolution increasing unit. in response to the resolution comparison unit determining that the resolution level of the current mesh is equal to the desired resolution level, an output unit is configured to output the current mesh.

Other features and aspects will become apparent to those skilled in the art from the following detailed description, the attached drawings, and the claims.

BRIEF DESCRIPTION OF THE DRAWINGS

FIG. 3 is a flowchart showing an example of a mesh decoding method.

Figure 1:
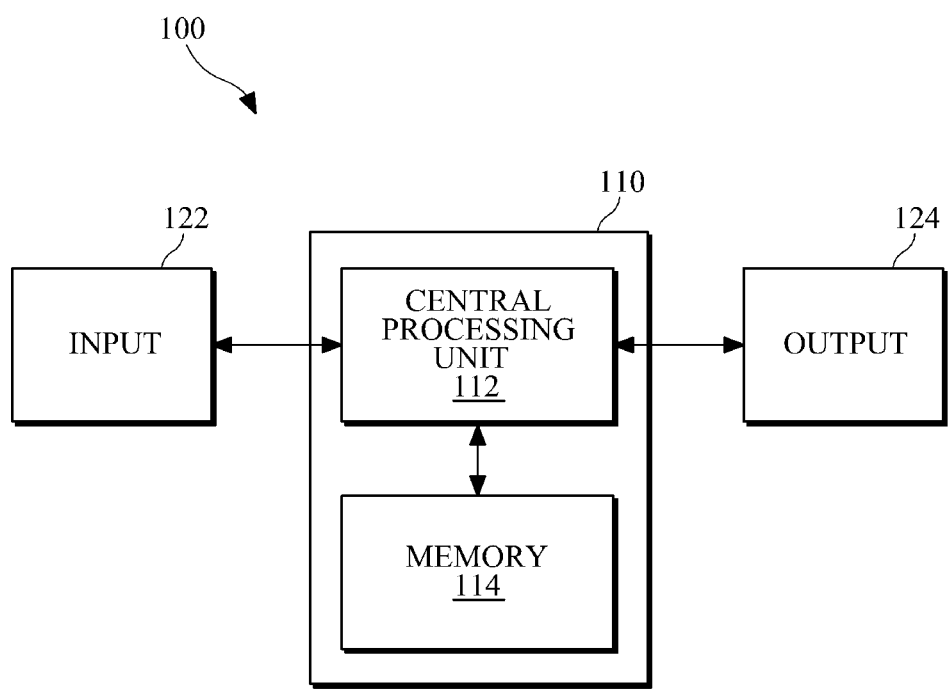
FIG. 1 is a block diagram showing a computer system used to implement an example of progressive mesh decoding.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Descriptions of well-known functions and structures are omitted to enhance clarity and conciseness.

FIG. 1 is a block diagram showing a computer system 100 used to implement an example progressive mesh decoding. The computer system 100 is not limited thereto and maybe provided in various forms. The computer system 100 may be, e.g., a personal computer (PC), a notebook computer, a mobile communication device, a personal digital assistant (PDA) or a portable game system, on which a three-dimensional graphic application program is installed. As shown in FIG. 1, the computer system 100 includes a computer 110 including a central processing unit (CPU) 112 and a memory 114, an input device 122, and an output device 124. The components of the computer system 100 may be connected to each other in a bus structure.

The CPU 112 fetches instructions from a memory 114 and interprets and execute the instructions. A progressive mesh decoding algorithm to be described later is embodied in the form of a computer program and implemented through the central processing unit 112. The computer system 100 may be provided with one or more CPUs 112. Each of the central processing units 112 includes an execution unit or an arithmetic logic unit (ALU) to perform various operations, a register to temporarily store data and instructions, a control unit to control an operation of the central processing unit 112 and an internal bus. The central processing unit 112 is not limited thereto and may be provided in various types as long as the central processing unit 112 is capable of performing the progressive mesh decoding algorithm.

The memory 114 may store a computer program and data over a short or long period of time. For example, the memory 114 may include various application programs, for example, an operating system (OS) program and software on which the progressive mesh decoding algorithm is implemented. The memory 114 may store mesh data generated through the progressive mesh decoding algorithm over a short or long period of time. In addition, the memory 114 may store vertex level information additionally recorded during execution of the progressive mesh decoding algorithm. The memory 114 may be provided in various types for different uses. For example, the memory 114 may be a random access memory (RAM) and/or a read only memory (ROM). For the purpose of data storage over a long period, the memory 114 may be embodied as an ROM, an optical disk, a magnetic disk, a solid state disk (SSD), an organic memory or a volatile or non volatile mass storage system.

The input device 122 is configured to provide input to the computer 110, and may be, for example, a keyboard, a mouse, and/or an audio device such as a microphone. The output device 124 is configured to provide output from the computer 110, and may be, for example, a display apparatus, a printer, and/or an audio device such as a speaker. The input device 122 and the output device 124 may include a network connection device, a modem, or a device providing a connection with another computer system or apparatus.

A computing system or a computer, e.g, computer system 100, may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

Figure 2:
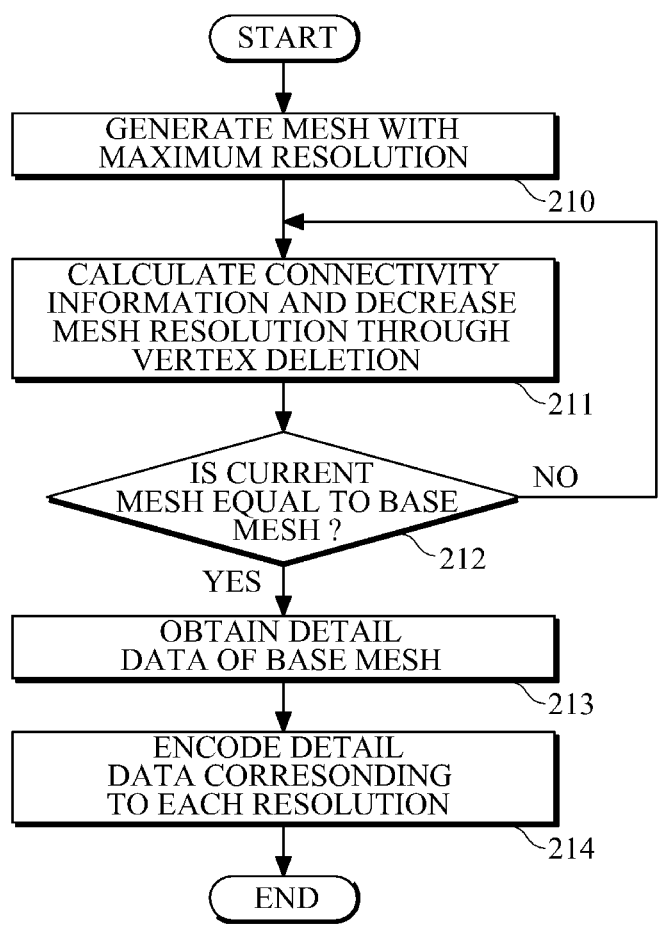
FIG. 2 is a flowchart showing a progressive mesh encoding algorithm.

FIG. 2 is a flowchart showing a mesh encoding algorithm. As shown in FIG. 2, if an encoding algorithm is performed, encoded mesh data, that is, base mesh data and detail data for different resolutions are generated. The encoded mesh data may be used in an example of a progressive mesh decoding apparatus and an example of a progressive mesh decoding method.

As shown in FIG. 2, first, a mesh having a maximum resolution ($L_{MAX}$) may be generated with respect to an object to be represented in a three-dimensional graphic (operation 210). For example, where the mesh having the maximum resolution ($L_{MAX}$) generated in operation 210 is used as an input into the progressive mesh encoding algorithm, a method of generating the mesh having the maximum resolution ($L_{MAX}$) is not limited. Although an example of a mesh has a triangular shape, the shape of the mesh is not limited thereto. For example, the mesh may be provided in the form of another polygon such as quadrilateral. The type of polygon constituting a mesh having the maximum resolution ($L_{MAX}$) may be determined in consideration of both of the encoding algorithm and the decoding algorithm. Otherwise, the type of polygon may be included in the mesh data having encoded information of indicating the type of mesh.

After calculating connectivity information between vertices included in the input mesh having the maximum resolution ($L_{MAX}$), a resolution of the mesh, that is, a level of detail (LOD) may be lowered through a vertex deletion by one level (operation 211). In operation 211, vertices may be deleted until the mesh having the maximum resolution ($L_{MAX}$) is changed into a mesh having one level decreased resolution ($L_{MAX-1}$), and geometry information about the deleted vertices is obtained. The geometry information of the deleted vertices can be included in detail data corresponding to the maximum resolution ($L_{MAX}$) together with connectivity information among vertices included in the mesh having the maximum resolution ($L_{MAX}$).

In operation 211, an algorithm of deleting vertices is not limited and may be provided in various schemes except for an edge collapse algorithm in which two vertices are merged into a new vertex. That is, in operation 211, as vertices are deleted from a mesh, the resolution of the mesh may be lowered, but new vertices may not be generated with the deletion of vertices. If an edge collapse algorism is used, a large amount of data may be required to represent geometry information of newly added vertices and connectivity information of the new vertices. In addition, mesh data generated through the edge collapse algorithm may not be applied to the progressive mesh decoding algorithm, and details of the progressive mesh decoding algorithm will be described later.

After that, it is determined whether the resolution ($L_{MAX-1}$) of the current mesh has reached a resolution of the base mesh (operation 212). The resolution of the base mesh may vary depending on the system. For example, the maximum resolution ($L_{MAX}$) mesh may reach the resolution of the base mesh by repeating the vertex deletion process by a number of times preset in the system. As a result of operation 212, in response to the resolution ($L_{MAX-1}$) of the current mesh being higher than the resolution of the base mesh, operation 211 may be repeated. That is, the connectivity information between vertices of the current mesh is calculated and the vertex deletion is performed such that the resolution of the current mesh is lowered by one level into a resolution ($L_{MAX-2}$). After that, the mesh having the resolution ($L_{MAX-2}$) may be subject to operation 212.

In operation 212, in response to a resolution of a current mesh that is lower than the maximum resolution ($L_{MAX}$) by N levels being determined to be equal to the resolution of the base mesh, a subsequent operation may be performed (operation 213). In operation 213, detail data of the base mesh, that is, geometry information and connectivity information of vertices remaining in the base mesh are obtained.

After that, detail data for respective resolutions, that is, ranging from the resolution ($L_{MAX-N}$) of the base mesh to the maximum resolution ($L_{MAX}$) may be encoded by use of a predetermined encoding algorithm (operation 214). The encoding algorithm used in operation 214 is not limited. As shown in FIG. 2, the detail data for respective resolutions may be generated in operation 211 and operation 213, and can include geometry information of vertices and connectivity information of vertices included in each of the meshes. In this example, the detail data of high resolution mesh from $L_{MAX-(N-1)}$ to $L_{MAX}$ that is generated through operation 211 includes geometry information of deleted vertices, but the detail data of the base mesh having a resolution $L_{MAX-N}$ that is generated through operation 213 includes geometry information of vertices remaining in the base mesh instead of deleted vertices.

FIG. 3 is a flowchart showing an example of a progressive mesh decoding method. The progressive decoding mesh decoding method may be implemented in the form of a computer program and may be recorded in a computer readable portable storage medium, e.g., a non-transitory computer readable storage medium, or recorded in the memory (e.g., memory 114 in FIG. 1) of the computer system 100 shown in FIG. 1. The computer program may be executed in the CPU (e.g., CPU 112 in FIG. 1) of the computer system 100 shown in FIG. 1.

As shown in FIG. 3, the detail data of the base mesh that is included in the encoded mesh data is decoded to reconstruct the base mesh, and vertex level information is recorded in respective decoded vertices, in which the base mesh has a first resolution (operation 320). The decoding process may be achieved a decoding algorithm corresponding to the encoding algorithm which has been used in operation 214 shown in FIG. 2. The process of reconstructing the base mesh by use of the decoded detail data of the base mesh is not limited. For example, a mesh having the lowest resolution, e.g., a mesh having the first resolution, may be reconstructed by use of geometry information and connectivity information of vertices included in the base mesh obtained through the decoding.

In operation 320, the vertex level information is recorded in the respective decoded vertices. The term "vertex level information" is arbitrarily used to refer to a resolution of a mesh to which vertices are added or refer to a predetermined integer indicating the resolution. That is, the "vertex level information" may be represented as an integer that is directly proportional to the resolution. In this example, the vertices included in the base mesh have vertex level information indicating the lowest resolution, for example, 1. In addition, when vertices are added to increase the resolution of a mesh, a resolution or a value indicating a resolution indicating a mesh, to which the vertices are added, is recorded in the added vertices as the vertex level information.

Figure 4A:
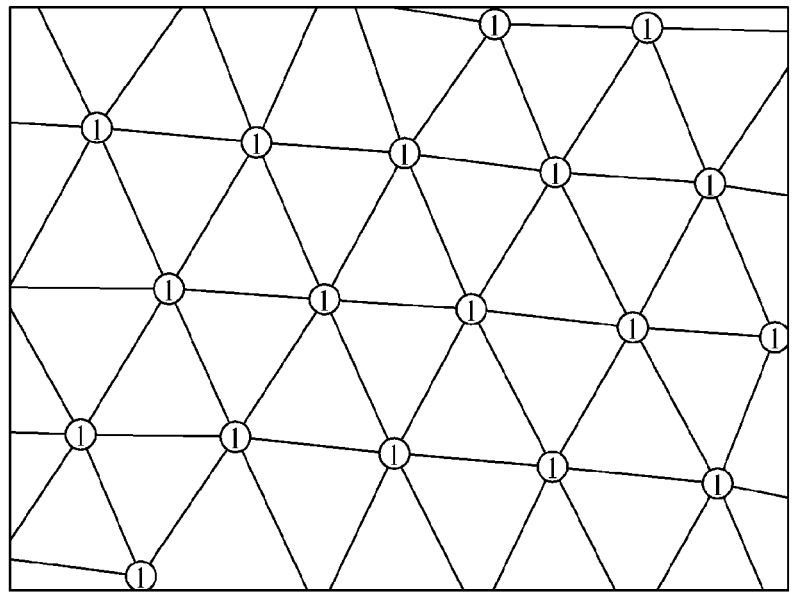
FIGS. 4A to 4C are views showing a mesh reconstructed through the example progressive mesh decoding method.

Such vertex level information may not be included in the encoded mesh data and may be newly added corresponding to respective vertices according to the decoding algorithm. The added vertex level information may be stored in the storage (e.g., memory 114 in FIG. 1) of the FIG. 1 computer system 100. The vertex level information may be represented by use of data bits. For example, if the progressive mesh algorithm supports eight resolutions or below, the vertex level information can be represented by use of three bits or more (for example, 1 byte). FIG. 4A is a view showing a base mesh that is reconstructed through operation 320 and records the vertex level information "1".

Referring back to FIG. 3, it is determined whether the resolution of the reconstructed current mesh, e.g., the first resolution, is equal to a first desired resolution (operation 321). The reconstructed current mesh represents the base mesh reconstructed in operation 320. The first desired resolution may be a resolution of a three-dimensional object that is desired to be represented by a user or a predetermined resolution automatically determined in a graphic application device. In the former, the first desired resolution may be determined by a user and may be input through the input device (e.g., input 122 in FIG. 1). As a result of operation 321, the resolution of the reconstructed current mesh may not be equal to the first desired resolution, and, in response to the resolution of the reconstructed current mesh being lower than the first desired resolution, operation 322 may be performed. In response to the resolution of the reconstructed current mesh being equal to the first desired resolution, operation 323 may be performed.

In operation 322, detail data of a resolution, which is one level higher than the first resolution and hereinafter is referred to as a "second resolution," is decoded, and the detail data of the second resolution may be connected to the base mesh, thereby reconstructing a mesh having the second resolution. The decoded detail data of the second resolution may include geometry information of vertices, which are included in the second resolution mesh other than the first resolution mesh, and connectivity information among all vertices included in the second resolution mesh.

According to the example of a progressive mesh decoding algorithm, the resolution of the mesh may be increased by adding vertices to a previous mesh. The example progressive mesh decoding algorithm is different from a conventional progressive mesh decoding algorithm in which the resolution is increased through a vertex split. According to the vertex split, two or more vertices are generated when one vertex included in a low resolution mesh is deleted.

Figure 4B:
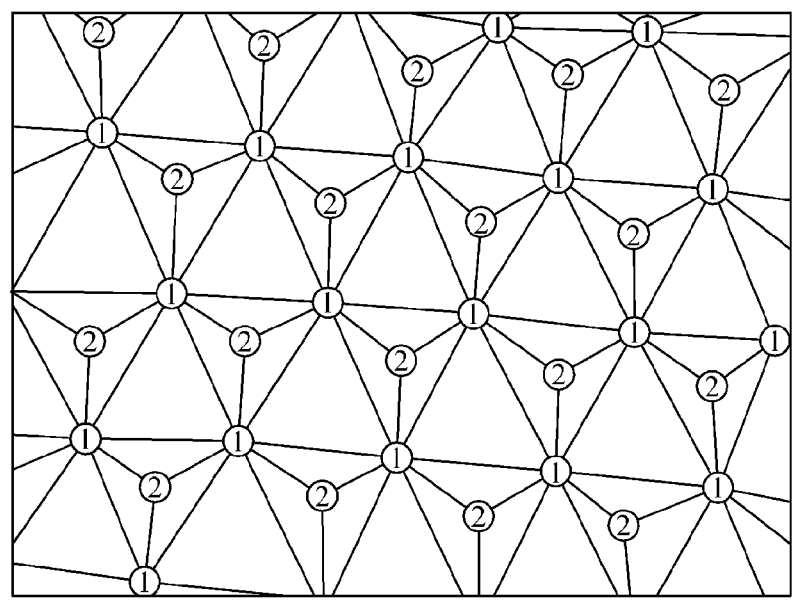

In operation 322, when the second resolution mesh is reconstructed, vertex level information for the second resolution mesh may be recorded. For example, a value (for example, "2") indicating a resolution one level higher than that of the base mesh may be recorded in the added vertices as the vertex level information, and such vertex level information may be stored in the memory (e.g., memory 114 in FIG. 1) of the FIG. 1 computer system 100. FIG. 4B is a view showing the second resolution mesh that is reconstructed by adding vertices to the base mesh shown in FIG. 4A, in which vertex level information "2" is recorded in the added vertices according to operation 322.

Figure 4C:
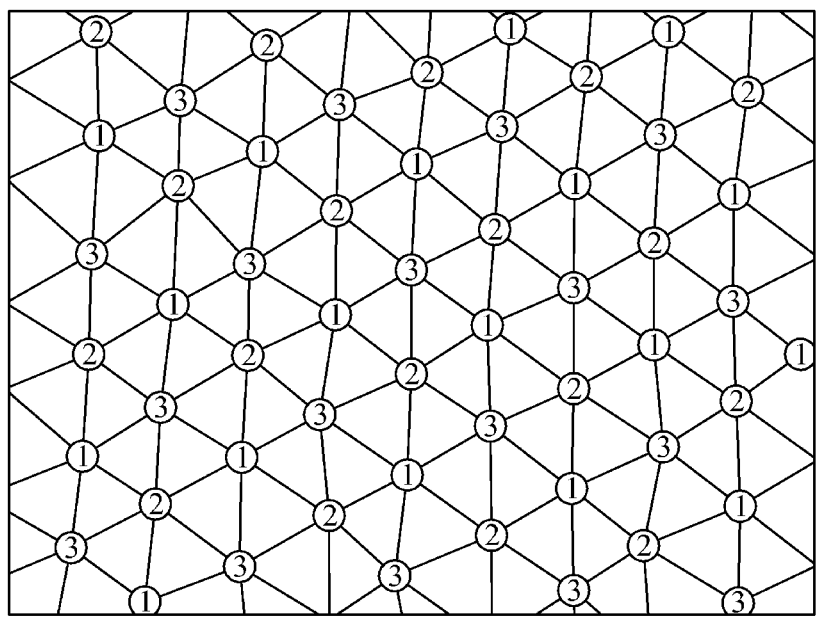

Next, operation 321 may be performed again to determine whether the reconstructed current mesh has a resolution equal to the first desired resolution. The reconstructed current mesh represents the second resolution mesh. As a result of operation 321, the resolution (the second resolution) of the reconstructed current mesh may not be equal to the first desired resolution, and, in response to the resolution of the reconstructed current mesh being lower than the first desired resolution, operation 322 may be performed. Accordingly, a mesh having a resolution higher than the second resolution by one level (hereinafter referred to as a "third resolution") may be reconstructed, and vertex level information "3" for the third resolution mesh may be recorded to vertices added to the second resolution mesh. FIG. 4C is a view showing the third resolution mesh that is reconstructed by adding vertices to the second resolution mesh through the operation 322, in which the vertex level information "3" is recorded in the vertices added to the second resolution mesh shown in FIG. 4B.

The process of performing operation 322 after operation 321 may be repeated. Meanwhile, in response to a resolution of a reconstructed current mesh being equal to the first desired resolution, operation 323 may be performed after operation 321, instead of operation 322.

In operation 323, in response to the reconstructed current mesh having a resolution equal to the first desired resolution, the current mesh may be output. The output mesh may be the reconstructed mesh itself or a three-dimensional geometric model which has been subject to a predetermined modeling operation and exhibits three-dimensional effects. The three-dimensional geometric model may be represented through a display apparatus. The modeling operation may be applied to the resolution of a mesh reconstructed by repeatedly performing operation 320 or operation 322 at least one time. The modeling operation includes an extrusion, a constructive solid modeling (CSG) and/or a freeform deformation and may be performed on polygon facets constituting the reconstructed mesh of a predetermined resolution.

The modeling operation may be integrated into the progressive mesh decoding algorithm or may be separately performed through an algorithm different from the example progressive mesh decoding algorithm. That is, the modeling operation may be performed using another graphic application program different from a graphic application program used in the example progressive mesh decoding algorithm, or may be performed using the graphic application program of the example progressive mesh decoding algorithm in a different module.

In response to a second desired resolution different from the first desired resolution being input, the second desired resolution may be compared with the first desired resolution (operation 324). The second desired resolution may be a resolution determined by a user or a predetermined resolution automatically determined in a graphic application program or another associated program. As a result of operation 324, in response to the second desired resolution being higher than the resolution of a current mesh, operation 325 may be performed. In response to the second desired resolution being lower than the resolution of the current mesh, operation 326 may be performed.

In operation 325, the same operation as operation 322 may be performed. That is, detail data of a resolution, which is one level higher than the current resolution, for example, detail data of a fourth resolution one level higher than the third resolution, may be decoded, and the decoded data may be connected with a previous mesh having the third resolution, thereby reconstructing a mesh having the fourth resolution. When the four resolution mesh is reconstructed, vertex level information for the fourth resolution mesh may be recorded in respective vertices added to the third resolution mesh. In this example, a value (for example, 4) indicating a resolution higher than the third resolution is recorded as the vertex level information, and such vertex level information may be temporarily stored in the memory (e.g., memory 114 in FIG. 1) of the FIG. 1 computer system 100.

Next, operation 324 is performed again to determine whether the reconstructed current mesh has a resolution equal to the second desired resolution. The reconstructed current mesh may correspond to the fourth resolution mesh, and the second desired resolution may maintain the same value. As a result of operation 324, the resolution (e.g., the fourth resolution) of the reconstructed current mesh may not be equal to the second desired resolution, and, in response to the resolution of the reconstructed current mesh being lower than the second desired resolution, operation 325 may be performed again. As a result, a mesh having a resolution higher than the fourth resolution by one level (hereinafter referred to as a "fifth resolution") may be reconstructed, and vertex level information "5" for the fifth resolution mesh may be recorded to respective vertices added to the fourth resolution mesh. After operation 325, operation 324 may be repeated.

Meanwhile, as a result of operation 324, in response to the input second desired resolution being lower than the resolution of the reconstructed current mesh, operation 326 may be performed instead of operation 325. In operation 326, vertices to be deleted are selected by use of the vertex level information recorded in the respective vertices of the current mesh and then the selected vertices are deleted. After that, a mesh having a resolution one level lower than the current resolution may be reconstructed by generating polygonal meshes using remaining vertices (operation 326).

In operation 326, vertices to be deleted may be selected by use of the vertex level information that is recorded in the respective vertices in operation 320, in operations 320 and 322 or in operations 320, 322, and 325 For example, vertices having the vertex level information "3" corresponding to the resolution of the current mesh may be deleted. Alternatively, vertices having the maximum vertex level information among vertices included in the current mesh may be deleted. After that, a mesh having a resolution one level lower than the current mesh resolution, for example, the second resolution mesh shown in FIG. 4B, may be reconstructed by use of vertices remaining in the current mesh after the deletion of the vertices.

Next, operation 324 may be performed again to determine whether the reconstructed current mesh has a resolution equal to the second desired resolution. The reconstructed current mesh corresponds to the second resolution mesh, and the second desired resolution keeps the same value. As a result of operation 324, the resolution (e.g., the second resolution) of the reconstructed current mesh may not be equal to the second desired resolution, and, in response to the resolution of the reconstructed current mesh being higher than the second desired resolution, operation 326 may be performed again. In operation 326, similarly to the above description, the vertices having the vertex level information "2" corresponding to the resolution of the current mesh may be deleted by use of the vertex level information. After that, a new polygonal mesh (for example, triangle mesh) may be formed by use of vertices remaining in the current mesh after the deletion of the vertices, so that a mesh having a resolution one level lower than the current mesh, for example, the first resolution mesh shown in FIG. 4A, may be reconstructed. After operation 326, operation 324 may be repeated.

According to the example progressive mesh decoding algorithm, vertex level information may be recorded in respective vertices added in the process of reconstructing a mesh having a predetermined resolution. In addition, when reconstructing a mesh having a resolution lower than that of the output mesh, that is, a mesh having a resolution lower than that of the current mesh, the vertex level information may be used in determining vertices to be deleted. Accordingly, since the current mesh may be used in reconstructing a mesh having a resolution other than that of the current mesh, the algorithm of increasing a resolution from the lowest resolution mesh does not need to be used all the time. According to the example algorithm, since vertex level information may be stored in respective vertices, a mesh having lowered resolution can be reconstructed in real time. In addition, since the mesh resolution may be increased or decreased based on the current mesh, the resolution of the mesh can be adjusted in real time.

As shown in FIG. 3, in response to the reconstructed current mesh having a resolution equal to the second desired resolution, an operation may be performed after operation 324 (operation 327). In operation 327, the reconstructed current mesh may be output. Since the process of outputting the current mesh may be identical to that described in operation 323, detailed description thereof will be omitted in order to avoid redundancy.

Although the example progressive decoding has been described in that, when the second desired resolution is lower than that of the current mesh, the resolution of the current mesh is decreased through vertex deletion using vertex level information (operation 326), the present invention is not limited thereto. When the second desired resolution is lower than that of the current mesh, if operations 320 to 323, which are shown in FIG. 3 and are identical to the conventional progressive mesh decoding algorithm reconstructing a mesh from the base mesh, are simpler than operation 326 of the example progressive mesh decoding algorithm, operations 320 to 323 may be used instead of operation 326. Accordingly, operation 326 and the conventional progressive mesh decoding algorithm (corresponding to operations 320 to 323 shown in FIG. 3) may be adaptively selected for execution depending on a predetermined standard such as computational quantity.

Figure 5:
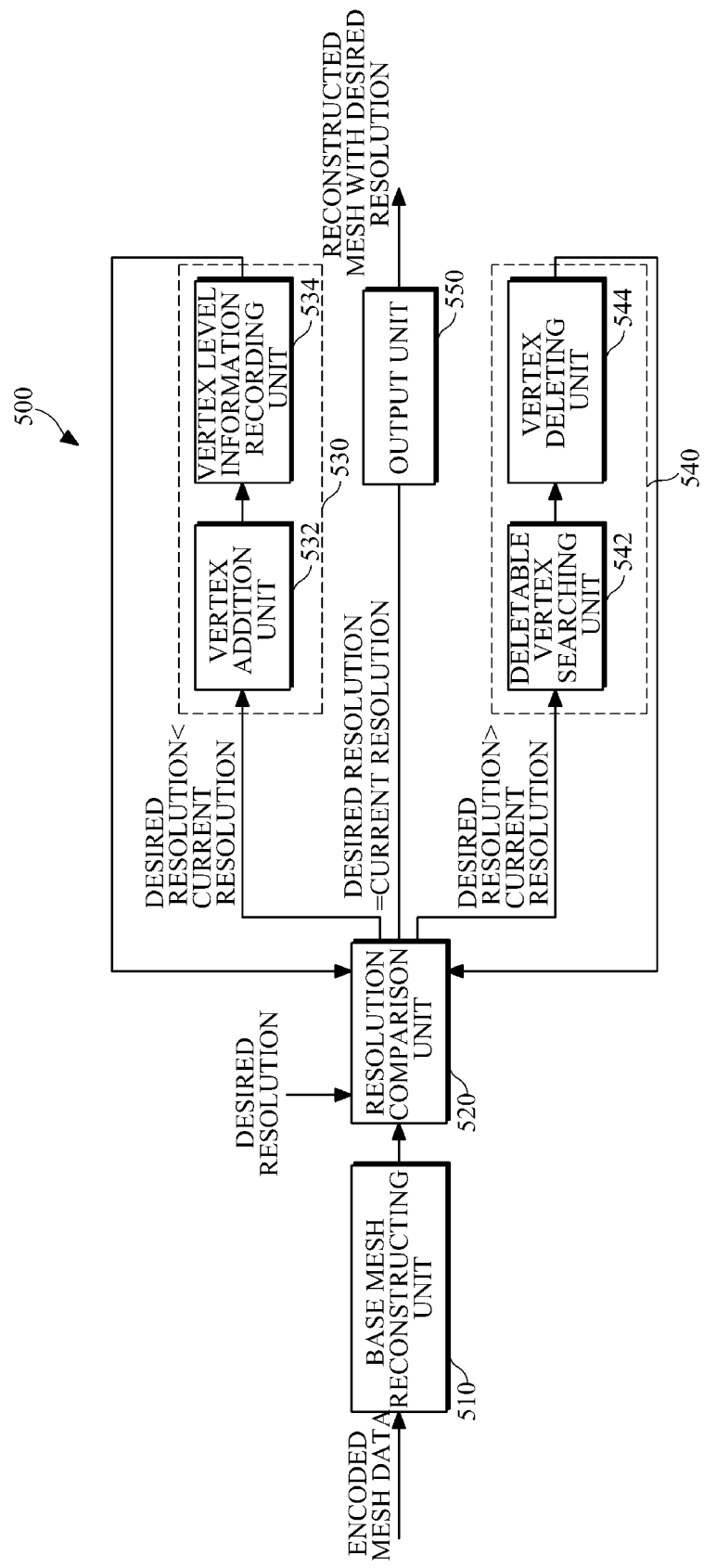
FIG. 5 is a block diagram showing an example of a progressive mesh decoding apparatus.

FIG. 5 is a block diagram showing an example of a progressive mesh decoding apparatus. As shown in FIG. 5, the progressive mesh decoding apparatus may be implemented through an application program and is stored in a memory of a computer system, e.g., computer system 100 of FIG. 1. Alternatively, the progressive mesh decoding apparatus may be implemented in the form of a module constituting a graphic application program. The configuration of the progressive mesh decoding apparatus is not limited thereto. The progressive mesh decoding apparatus shown in FIG. 5 is an example of implementing the progressive mesh decoding algorithm described in FIG. 3. Accordingly, the configuration and operation of the progressive mesh decoding apparatus will be briefly described in order to avoid redundancy.

As shown in FIG. 5, the progressive mesh decoding apparatus 500 includes a base mesh reconstructing unit 510, a resolution comparison unit 520, a resolution increasing unit 530, a resolution decreasing unit 540, and an output unit 550.

The base mesh reconstructing unit 510 may reconstruct a base mesh by decoding detail data of a base data that is included in input encoded mesh data. The base mesh reconstructing unit 510 may record vertex level information, which may indicate a resolution of the base mesh, in vertices of the reconstructed base mesh (e.g., operation 320 in FIG. 3). The process of recording the vertex level information may be performed simultaneously when the base mesh is reconstructed, or may be additionally performed after the base mesh is reconstructed.

The resolution comparison unit 520 compares a resolution of a current mesh with a desired resolution (e.g., operations 321 and 324 in FIG. 3). The resolution of the current mesh represents a resolution of a mesh reconstructed by the base mesh reconstructing unit 510, the resolution increasing unit 530, or the resolution decreasing unit 540. For the purpose of comparison of resolution, information indicating the desired resolution may be input into the resolution comparison unit 520. The scheme of determining the desired resolution is not limited.

In response to the current mesh having a resolution lower than the desired resolution, the resolution increasing unit 530 may increase the resolution of the current mesh by one level through vertex addition. In addition, the resolution increasing unit 530 may record vertex level information, which may indicate a resolution increased by one level, in the added vertices (refers to operations 322 and 325 in FIG. 3). As such, the resolution increasing unit 530 may include a vertex addition unit 532 and a vertex level information recording unit 534. The vertex addition unit 532 may decode detail information about a mesh having a resolution one level higher than that of a current mesh, that is, may decode information about added vertices and connectivity information of all vertices included in the mesh having the increased resolution, and then may reconstruct the mesh having the resolution one level higher than the resolution of the current mesh by use of the decoded detail information. The vertex level information recording unit 534 may record the vertex level information in the respective vertices that are added to the current mesh. The vertex addition unit 532 and the vertex level information recording unit 534 may be divided in a logical aspect, but may be implemented into an integral body or may be implemented as a set of subdivided logical functions.

In response to the resolution of the current mesh being higher than the desired resolution, the resolution decreasing unit 540 may reconstruct a mesh having a resolution one level lower than that of the current mesh through vertex deletion. As such, the resolution decreasing unit 540 may search for vertices to be deleted and may delete the found vertices such that the resolution of the current mesh is lowered by one level (refer to operation 326 in FIG. 3). The resolution decreasing unit 540 may include a deletable-vertex searching unit 542 and a vertex deleting unit 544. The deletion-vertex searching unit may search for vertices to be deleted by use of a predetermined algorithm. The vertices to be deleted may have vertex level information indicating a resolution of a current mesh or may have the maximum vertex level information. The vertex deleting unit 544 may delete the vertices found by the deletable-vertex searching unit 542 from the current mesh and then may reconstruct a mesh having the resolution one level lower than that of the current mesh by use of remaining vertices in the current mesh. The deletable-vertex searching unit 542 and the vertex deleting unit 544 may be divided in a logical aspect, but may be implemented into an integral body or may be implemented as a set of subdivided logical functions.

In response to the resolution of the current mesh being equal to the desired resolution, the output unit 550 may output the reconstructed current mesh. The output unit 550 may output the reconstructed current mesh without additional processing or may output a graphic of a three-dimensional model that is reconstructed by applying a predetermined modeling operation to the reconstructed mesh, for example, electronic transformation of the reconstructed current mesh data into a visual depiction, e.g., on a display device.

As described above, according to the example progressive mesh decoding apparatus and method, in the reconstruction of a predetermined resolution mesh, vertex level information indicating a resolution of a mesh in which vertices have been included may be stored. In response to a desired resolution being lower than the resolution of a reconstructed current mesh, vertices to be deleted may be determined by use of the vertex level information and then the found vertices may be deleted, thereby reconstructing a mesh having a required resolution. That is, a low resolution mesh can be reconstructed from a high resolution mesh. In addition, in response to a desired resolution being higher than the resolution of a current mesh, a mesh having a resolution one level higher than the current mesh may be reconstructed by adding vertices, in which the vertex level information may be recorded in the added respective vertices. According to the example progressive mesh decoding apparatus and method, when reconstructing a mesh having a desired resolution, the resolution of a mesh does not need to be increased from the base mesh. Accordingly, unnecessary operations accompanied when modifying a resolution can be minimized, and the operation time can be reduced. In addition, computer resources may be maximally utilized. In addition to an example in which the desired resolution is higher than the resolution of the current mesh, even if the desired resolution is lower than the resolution of the current mesh, a mesh having the desired resolution can be reconstructed in real time.

According to the example progressive mesh decoding apparatus and method, encoded mesh data generated through vertex deletion may be used as an input. As a result, the progressive mesh decoding may be achieved using small amount of mesh data as compared to a progressive mesh decoding employing an edge collapse algorithm that generates large amount of mesh data. Accordingly, required memory or network bandwidth can be reduced. According to the example progressive mesh decoding apparatus and method, when reconstructing a mesh, mesh data generated through the conventional progressive mesh encoding algorithm can be used without additional processing, and the reconstructing of a mesh may be achieved through the vertex addition, which can be accompanied by the recording of vertex level information, and the vertex deletion may be performed based on vertices level information. Accordingly, a mesh having a required resolution can be reconstructed in a rapid manner.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, non-transitory media, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A progressive mesh decoding method comprising:
   progressively reconstructing at a hardware-based resolution increasing unit a first desired resolution mesh having a first desired resolution level from a base mesh through vertex addition;
   recording vertex level information indicating a resolution level of the first desired resolution mesh at a hardware-based vertex level information recording unit for the vertices added; and
   in response to a second desired resolution mesh having a second desired resolution level lower than the first desired resolution level being requested, progressively reconstructing at a hardware-based resolution decreasing unit the second desired resolution mesh by vertex deletion, vertices to be deleted being determined at a hardware-based deletable-vertex searching unit based on the vertex level information,
   wherein the vertex addition comprises adding vertices to the base mesh and excluding adding two or more vertices by splitting a vertex, and
   wherein the vertex deletion comprises deleting vertices from first desired resolution mesh and excluding deleting a vertex by merging two vertices to form a vertex.

2. The progressive mesh decoding method of claim 1, wherein the vertex level information is represented as an integer that is directly proportional to the resolution level.

3. The progressive mesh decoding method of claim 2, further comprising determining, as the vertices to be deleted, vertices having vertex level information indicating a resolution level of the mesh needing the vertex deletion or vertices having maximum vertex level information among vertices included in the mesh needing the vertex deletion.

4. The progressive mesh decoding method of claim 1, further comprising, in response to a third desired resolution mesh having a third desired resolution level higher than the first desired resolution level being requested, progressively reconstructing at the hardware-based resolution increasing unit the third desired resolution mesh from the first desired resolution mesh through vertex addition, vertex level information indicating a resolution of a mesh corresponding to a predetermined process of the third desired resolution mesh reconstructing process being recorded at the hardware-based vertex level information recording unit for respective vertices added at the predetermined process.

5. The progressive mesh decoding method of claim 1, further comprising recording first desired resolution mesh or the second desired resolution mesh on a non-transitory computer-readable recording medium using a three-dimensional graphic application program.

6. A progressive mesh decoding method, comprising:
   reconstructing at a hardware-based base mesh reconstructing unit a mesh having a first resolution level corresponding to a lowest resolution level by decoding input encoded mesh data;
   recording first vertex level information indicating the first resolution level for vertices included in the first resolution mesh at a hardware-based vertex level information recording unit;
   determining at a hardware-based resolution comparison unit whether the first resolution level is equal to a first desired resolution level;
   in response to the first resolution level not being equal to the first desired resolution level, reconstructing at a hardware-based resolution increasing unit, a mesh having a second resolution level one level higher than the first resolution level by decoding detail data of the second resolution level for vertex addition, wherein second vertex level information indicating the resolution level for the vertices added to the first resolution mesh being recorded at the hardware-based vertex level information recording unit, and
   wherein the vertex addition comprises adding vertices to the first resolution mesh and excluding adding two or more vertices by splitting a vertex.

7. The progressive mesh decoding method of claim 6, further comprising:
   determining at the hardware-based resolution comparison unit whether the second resolution level is equal to the first desired resolution level; and
   in response to the second resolution level not being equal to the first desired resolution level, reconstructing at the hardware-based resolution increasing unit a mesh having a third resolution level one level higher than the second resolution level by decoding detail data of the third resolution level for vertex addition, third vertex level information indicating the resolution level for the vertices added to the second resolution mesh being recorded at the hardware-based vertex level information recording unit.

8. The progressive mesh decoding method of claim 7, wherein, until a mesh having an $N^{th}$ resolution level (N being an integer equal to or greater than 2) equal to the first desired resolution level is reconstructed, the mesh reconstructing process including the process of recording vertex level information at the hardware-based vertex level information recording unit for each resolution is repeated.

9. The progressive mesh decoding method of claim 8, further comprising:
   in response to an $N^{th}$ resolution mesh having a second desired resolution level lower than the first desired resolution level being requested after the mesh having the $N^{th}$ resolution level is output, searching at a hardware-based deletable-vertex searching unit for vertices having vertex level information indicating the $N^{th}$ resolution level among vertices included in the $N^{th}$ resolution mesh and deleting at a hardware-based vertex deleting unit the vertices having the vertex level information indicating the $N^{th}$ resolution level from the $N^{th}$ resolution mesh, thereby reconstructing a $N-1^{th}$ resolution mesh having an $N-1^{th}$ resolution level; and
   determining at the hardware-based resolution comparison unit whether the $N-1^{th}$ resolution level is equal to the second desired resolution level.

10. The progressive mesh decoding method of claim 9, further comprising, in response to the $N-1^{th}$ resolution level being equal to the second desired resolution level, outputting the $N-1^{th}$ resolution mesh at a hardware-based output unit.

11. The progressive mesh decoding method of claim 9, further comprising, in response to the $N-1^{th}$ resolution level not being equal to the second desired resolution level, repeating the process of reconstructing a mesh having a resolution level lower than a previous resolution level at the hardware-based vertex deleting unit until a mesh having an $M^{th}$ resolution level (where M is equal to or greater than 1 and less than N) equal to the second desired resolution level is reconstructed.

12. The progressive mesh decoding method of claim 6, further comprising recording the mesh on a non-transitory computer-readable recording medium using a three-dimensional graphic application program.

13. A progressive mesh decoding apparatus, comprising:
a hardware-based base mesh reconstruction unit configured to reconstruct a base mesh by decoding detail data of a base data included in input encoded mesh data;
a hardware-based resolution comparison unit configured to compare a resolution level of a reconstructed current mesh with an input desired resolution level;
a hardware-based resolution increasing unit configured to reconstruct, in response to the resolution level of the current mesh being lower than the input desired resolution level, a mesh having a resolution level one level higher than the resolution level of the current mesh through vertex addition, vertex level information indicating the resolution level one level higher than that of the current mesh being recorded for the added vertices;
a hardware-based resolution decreasing unit configured to reconstruct, in response to the resolution level of the current mesh being higher than the input desired resolution level, a mesh having a resolution level one level lower than the resolution level of the current mesh by vertex deletion, vertices to be deleted being determined by use of the vertex level information recorded by the resolution increasing unit; and
a hardware-based output unit configured to output the current mesh in response to the resolution comparison unit determining that the resolution level of the current mesh is equal to the desired resolution level,
wherein the vertex addition comprises adding vertices to the base mesh and excluding adding two or more vertices by splitting a vertex, and
wherein the vertex deletion comprises deleting vertices from the first desired resolution mesh and excluding deleting a vertex by merging two vertices to form a vertex.

14. The apparatus of claim 13, wherein the resolution level of the reconstructed current mesh has a resolution level equal to a resolution level of a mesh that is input from the hardware-based base mesh reconstruction unit, the resolution increasing unit, or the resolution decreasing unit.

15. The apparatus of claim 13, wherein the hardware-based resolution increasing unit comprises:
a hardware-based vertex addition unit configured to reconstruct the mesh having the resolution level one level higher than the resolution level of the current mesh by decoding detail information about the mesh having the resolution level one level higher than that of the current mesh; and
a hardware-based vertex level information recording unit configured to record the vertex level information in the vertices added to the current mesh.

16. The apparatus of claim 13, wherein the hardware-based resolution decreasing unit comprises:
a hardware-based deletable vertex searching unit configured to search for vertices to be deleted by use of a predetermined algorithm; and
a hardware-based vertex deleting unit configured to delete the vertices found by the deletable vertex searching unit from the current mesh and reconstruct the mesh having the resolution level one level lower than that of the current mesh by use of remaining vertices in the current mesh.

17. The apparatus of claim 16, wherein the hardware-based deletable vertex searching unit determines, as the vertices to be deleted, vertices on which vertex level information indicating the resolution level of the current mesh is recorded or vertices having a maximum resolution level among vertices of the current mesh.

18. A method of dynamically adjusting a resolution level of a mesh, the method comprising:
comparing at a hardware-based resolution comparison unit an input desired resolution level with a resolution level of a current mesh;
in response to the resolution level of the current mesh being lower than the desired resolution level, progressively reconstructing at a hardware-based resolution increasing unit a mesh having the desired resolution level from the current mesh through vertex addition, vertex level information indicating a resolution level of the desired resolution mesh being recorded for the vertices added at a hardware-based vertex level information recording unit; and
in response to the resolution level of the current mesh being higher than the desired resolution level, progressive reconstructing at a hardware-based resolution decreasing unit a mesh having the desired resolution level from the current mesh through vertex deletion, vertices to be deleted being determined at a hardware-based deletable-vertex searching unit by use of vertex level information recorded for vertices included to the current mesh,
wherein the vertex addition comprises adding vertices to the base mesh and excluding adding two or more vertices by splitting a vertex, and
wherein the vertex deletion comprises deleting vertices from the first desired resolution mesh and excluding deleting a vertex by merging two vertices to form a vertex.

* * * * *